R. S. JUDSON & C. J. HANCOCK.
Flower-Stand.
No. 217,010. Patented July 1, 1879.
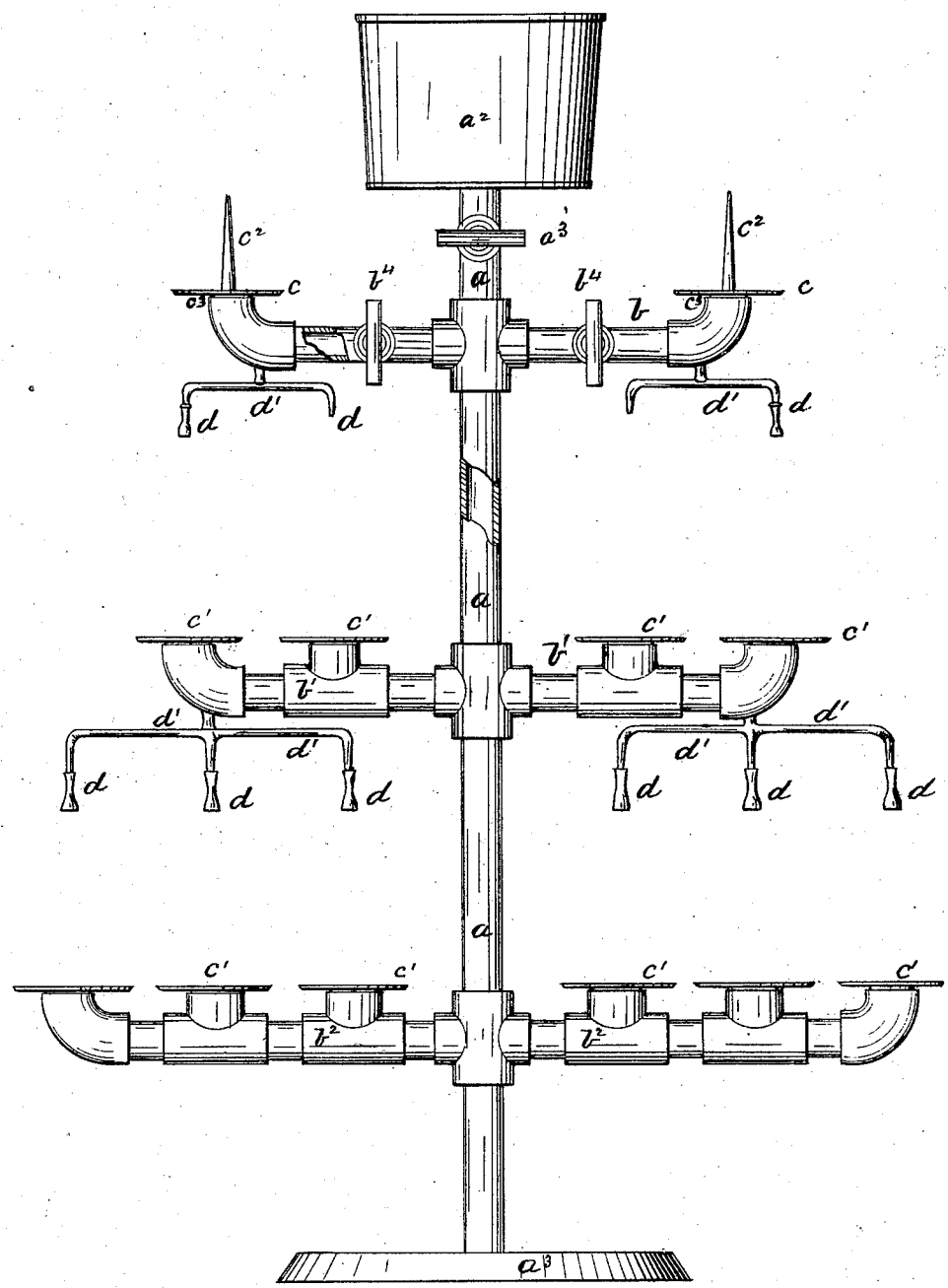

UNITED STATES PATENT OFFICE.

ROSWELL S. JUDSON AND CYRUS J. HANCOCK, OF MATTEAWAN, N. Y.

IMPROVEMENT IN FLOWER-STANDS.

Specification forming part of Letters Patent No. 217,010, dated July 1, 1879; application filed April 24, 1879.

*To all whom it may concern:*

Be it known that we, ROSWELL S. JUDSON and CYRUS J. HANCOCK, of Matteawan, in the county of Dutchess and State of New York, have invented certain new and useful Improvements in Flower-Stands; and we do hereby declare that the following is a full, clear, and exact description of the invention, which will enable others skilled in the art to which it appertains to make and use the same, reference being had to the accompanying drawing, and to letters of reference marked thereon, which form a part of this specification.

This invention relates to that class of flower-stands having a reservoir and pipe leading to the several parts, by which the plants in the latter may be watered automatically.

It consists in the peculiar construction and arrangement of the several parts hereinafter explained, and pointed out in the claims.

In the drawing is shown an elevation of a flower-stand made according to our invention.

The stand is made of ordinary gas or water piping.

$a$ is the main vertical stem, supported on the base $a^3$, and on the upper end of which is placed a reservoir, $a^2$, having in its bottom an opening covered by a wire net or sieve, through which the water flows into the pipes. Below the reservoir a stop-cock, $a^{3\prime}$, is placed, by which the flow of water may be regulated or stopped.

To the main stem $a$ we affix a series of lateral arms, $b$ $b^1$ $b^2$, which may be extended to any desired length. On the upper sides of these arms we affix cups or pot-rests $c$ $c^1$. The cups $c$ on the topmost arms have small vertical tubes $c^2$, which are designed to be thrust up into the earth through the small openings in the bottom of the ordinary flower-pot.

Tubes $c^2$ may be placed on all the cups, if desired, as they will serve not only as supply-pipes to keep the earth in the bottom of the pots, but to hold the latter more firmly in place.

The arms are provided with stop-cocks $b^4$, by which the flow of water may be shut off or regulated at pleasure.

On the under side of the arms we arrange sprinklers $d$, supported on arms $d'$, which are so constructed and arranged as to supply water to plants arranged on the cups of the arms next below, as will be clearly understood by inspection of the drawing.

The lower end of the main stem $a$ is closed water-tight just below the lower arm, $b^2$.

We do not limit ourselves to the construction of the device with any specified number of side arms, $b$ $b^1$ $b^2$, for it will be clear that any number may be made.

The cups $c$ $c^1$ are constructed with a threaded nipple, $c^3$, which permits them to be removed from the stand for any desired purpose.

The water is placed in the reservoir $a^2$, and flows into the stem $a$ and out through the lateral arms. The stem $c^2$ of the cups $c$ lets the water into the pots directly to the roots of the plants, while the sprinklers $d$ will throw the water onto the leaves of the plants in the arms next below.

It is often desired to employ potted plants for decorating purposes. In our device the cup $c$ will be unscrewed from its arm and taken with the pot to any desired place, thus doing away with the ordinary earthen saucer employed in such cases to prevent the water from dripping onto the carpet or floor.

Having fully described our invention, what we claim is—

1. The improved flower-stand made of piping, consisting of the main stem $a$ and a series of lateral arms, $b$ $b^1$ $b^2$, the reservoir $a^2$, cups $c$, and sprinklers $d$, and having stop-cocks, arranged substantially as and for the purpose set forth.

2. The combination, with the arm $b$ of a flower-stand, in which water is supplied automatically to the plants, of a sprinkling device, $d$, connected to its under side, and arranged to supply water to the plants placed in the cups of the arm next below, substantially as set forth.

3. In an automatic watering flower-pot stand, the cup $c$, constructed with a central hollow stem or tube, $c^2$, substantially as and for the purposes stated.

In testimony that we claim the foregoing as our own we affix our signatures in presence of two witnesses.

ROSWELL S. JUDSON.
CYRUS J. HANCOCK.

Witnesses:
JOHN O'REILLY,
WINSLOW P. HYATT.